(12) United States Patent
Hayon et al.

(10) Patent No.: US 10,096,030 B1
(45) Date of Patent: Oct. 9, 2018

(54) APPARATUS, COMPUTER PROGRAM, AND METHOD FOR GENERATING A PROBLEM TICKET WITH A LINK TO A CLONED ENVIRONMENT

(71) Applicant: Amdocs Development Limited, Limassol (CY)

(72) Inventors: Meir Ben Hayon, Hod Hasharon (IL); Aharon Weissman, Kfar Saba (IL)

(73) Assignee: Amdocs Development Limited, Limassol (CY)

( * ) Notice: Subject to any disclaimer, the term of this patent is extended or adjusted under 35 U.S.C. 154(b) by 57 days.

(21) Appl. No.: 15/283,072

(22) Filed: Sep. 30, 2016

(51) Int. Cl.
*G06F 11/00* (2006.01)
*G06Q 30/00* (2012.01)

(52) U.S. Cl.
CPC .................... *G06Q 30/016* (2013.01)

(58) Field of Classification Search
USPC .......................................................... 714/48
See application file for complete search history.

(56) References Cited

U.S. PATENT DOCUMENTS

| | | | |
|---|---|---|---|
| 13,689,214 | | 4/2014 | Marshall et al. |
| 8,856,077 | B1 | 10/2014 | Roth et al. |
| 9,075,788 | B1 | 7/2015 | Roth et al. |
| 2007/0288800 | A1* | 12/2007 | Chavez, Jr. ............... G06F 1/28 714/39 |
| 2008/0189575 | A1* | 8/2008 | Miguelanez ....... G05B 23/0229 714/25 |
| 2009/0204852 | A1* | 8/2009 | Diggs ................... G06F 11/008 714/42 |
| 2010/0057405 | A1 | 3/2010 | Wu |
| 2012/0144236 | A1* | 6/2012 | Black ..................... H04L 41/145 714/25 |
| 2013/0139128 | A1 | 5/2013 | Jones et al. |
| 2014/0115147 | A1 | 4/2014 | de Assuncao et al. |

FOREIGN PATENT DOCUMENTS

| | | |
|---|---|---|
| CA | 2506303 A1 | 9/2005 |
| WO | 2013006266 A1 | 1/2013 |

OTHER PUBLICATIONS

Wikipedia, "CloudShare," last modified Sep. 22, 2016, pp. 1-2, retrieved from https://en.wikipedia.org/wiki/CloudShare.
Wikipedia, "SkyTap," last modified Sep. 22, 2016, pp. 1-3, retrieved from https://en.wikipedia.org/wiki/Skytap.

* cited by examiner

*Primary Examiner* — Sarai E Butler
(74) *Attorney, Agent, or Firm* — Zilka-Kotab, P.C.

(57) ABSTRACT

An apparatus, computer program, and method are provided for generating a problem ticket with a link to a cloned environmental state. At least one problematic scenario is detected in connection with a system associated with a customer of a communication service provider (CSP). In response to the detection of the at least one problematic scenario in connection with the system associated with the customer of the CSP, an environmental state of the system is automatically cloned, including a file system memory state and one or more live processes of the system, so as to create a cloned environmental state. As an option, a problem ticket for the at least one problematic scenario is provided with a link to the cloned environmental state of the system for analysis.

14 Claims, 7 Drawing Sheets

APPARATUS, COMPUTER PROGRAM, AND METHOD FOR GENERATING A PROBLEM TICKET WITH A LINK TO A CLONED ENVIRONMENT

FIELD OF THE INVENTION

The present invention relates to system maintenance, and more particularly to problem ticketing.

BACKGROUND

In the domain of product support and maintenance for large scale systems, a typical a challenge product vendor has to face is in regards to an isolation of and/or access to customer environments, so that support may be administered. In such regard, executing thorough, accurate, fast and professional support often depends on an availability of the customer environment where a reported problem was identified. Further, effective analysis requires that customer environments hold the same environment configuration, settings, and possibly applicable data, in order to allow a support engineer to reproduce the problematic scenario in an identical condition where the problem occurred.

In many situations, such environments are not always available to the support team by the time case analysis starts. There could be many reasons for this, such as: environment implementation modification, environment reconstruction, environment deletion, security reasons, etc. As such, the effectiveness of a support team is reduced (i.e. time is wasted) as the support team seeks to receive valid environments. Further, customers may become frustrated in receiving repeated requests from support teams in order to gain access to the customer's valid reproduction environment.

There is thus a need for addressing these and/or other issues associated with the prior art.

SUMMARY

An apparatus, computer program, and method are provided for generating a problem ticket with a link to a cloned environmental state. At least one problematic scenario is detected in connection with a system associated with a customer of a communication service provider (CSP). In response to the detection of the at least one problematic scenario in connection with the system associated with the customer of the CSP, an environmental state of the system is automatically cloned, including a file system memory state and one or more live processes of the system, so as to create a cloned environmental state. As an option, a problem ticket for the at least one problematic scenario is provided with a link to the cloned environmental state of the system for analysis.

DETAILED DESCRIPTION

Figure 1:
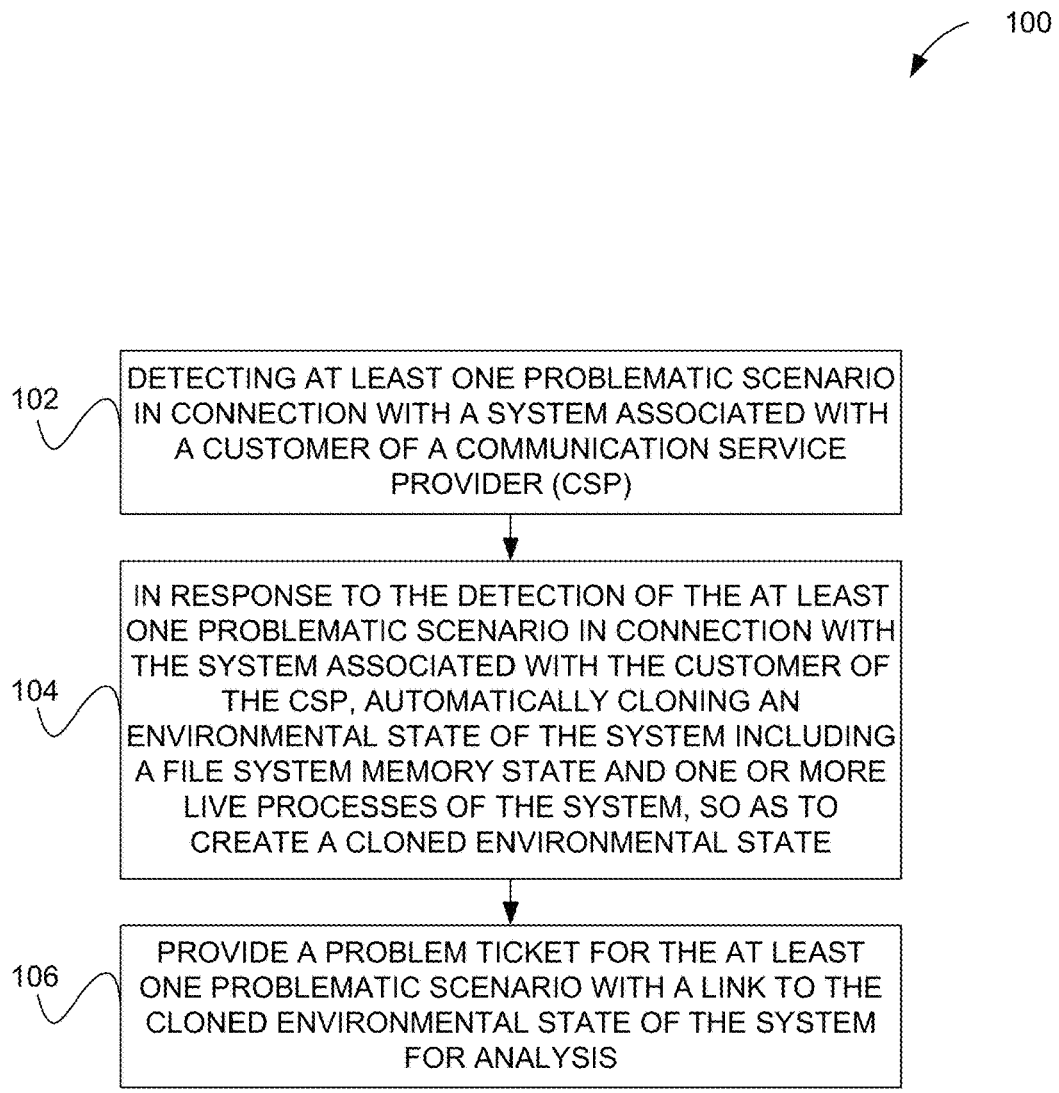
FIG. 1 illustrates a method for generating a problem ticket with a link to a cloned environmental state, in accordance with one embodiment.

FIG. 1 illustrates a method 100 for generating a problem ticket with a link to a cloned environmental state, in accordance with one embodiment. As shown, in operation 102, at least one problematic scenario is detected in connection with a system associated with a customer of a communication service provider (CSP). In the context of the present description, the problematic scenario may refer to any situation where the aforementioned system exhibits one or more characteristics (e.g. error, subpar operation, failure, etc.) indicative of a requirement for maintenance or service. Further, the aforementioned system may include any computing resource or component thereof of the CSP which, in turn, may refer to any provider of communications services, e.g. telecommunication service provider, etc.

In response to the detection of the at least one problematic scenario in connection with the system associated with the customer of the CSP, an environmental state of the system is automatically cloned in operation 104, so as to create a cloned environmental state. In the context of the present description, the aforementioned environmental state and/or cloned environmental state may refer to any data structure that includes or describes some or all of the state of the system, including at least a file system memory state and one or more live processes of the system. Further, the file system memory state may refer to some or all of the contents and/or condition of the file memory of the system. Still yet, the foregoing live processes may refer to any process that is running at a time that the environmental state is cloned.

As indicated in operation 106, a problem ticket for the at least one problematic scenario is provided (e.g. by being automatically generated, by utilizing an already-existing one, etc.) with a link to the cloned environmental state of the system for analysis. In the context of the present description, the problem ticket includes any data structure that is configured for tracking the at least one problematic scenario for use by an administrator (e.g. any user capable of addressing the problematic scenario, etc.) to analyze the scenario and to rectify the same. Still yet, the link may refer to any data structure and/or code configured for permitting access to the cloned environmental state or a portion thereof (via one or more steps) from the problem ticket.

It should be noted that the problem ticket may be associated with the link in any desired manner. For example, in one embodiment, the problem ticket may include the link while, in other embodiments, the problem ticket may be more generally associated with the problem ticket. It should also be noted that, in various embodiments, the order of the foregoing operations 102-106 may be rearranged and/or reversed, as desired.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the exclusion of other features described.

Figure 2:
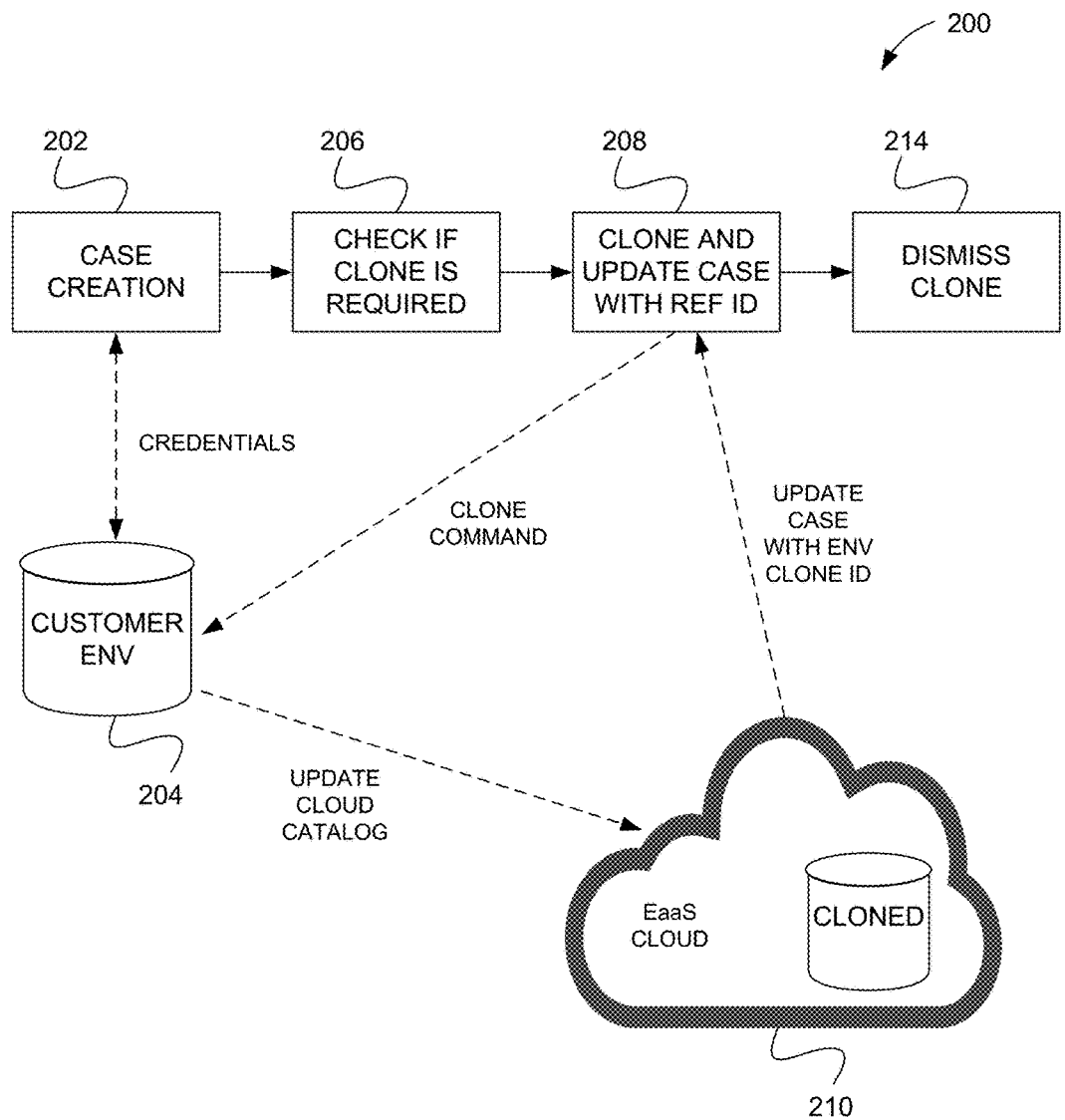
FIG. 2 illustrates a framework for generating a problem ticket with a link to a cloned environmental state, in accordance with one embodiment.

FIG. 2 illustrates a framework 200 for generating a problem ticket with a link to a cloned environmental state, in accordance with one embodiment. As an option, the framework 200 may be implemented in the context of any one or more of the embodiments set forth in any previous and/or subsequent figure(s) and/or description thereof. However, it is to be appreciated that the framework 200 may be implemented in the context of any desired environment.

As shown, a case may be created in operation 202 by, for example, generating a problem ticket. Operation 202 may be accomplished, for example, by using credentials (e.g. user name, password, etc.) to access a customer environment 204. With such access, the customer environment 204 may be monitored for identifying any problematic scenarios. Upon identifying such a problematic scenario, the case may be created per operation 202. In one possible embodiment, a production environment may be monitored up front by setting environment parameters that alert/trigger a clone process only when a failure has occurred, without a need for creating an ad-hoc ticket.

Next, in operation 206, it may be determined whether a clone is required. In one embodiment, this may be accomplished by determining a severity level of the problematic scenario. If the severity level warrants a clone, a clone command may be issued to the customer environment 204 in operation 208, as illustrated. Such clone command, in turn, prompts the generation of a clone of the environmental state of the customer environment 204, as well as communication of the cloned state to a cloud computing platform 210, as shown. While not shown, such communication of the cloned state and storage thereof to the cloud computing platform 210 may be accomplished over a network (e.g. local/wide area network, Internet, etc.).

Still yet, as further indicated in operation 208, an identifier (e.g. reference id, etc.) associated with the cloned state may be communicated from the cloud computing platform 210 to a problem ticking system (that performs operations 202-208). Equipped with such identifier, the problem ticket may be associated with a link that, in turn, may be used to access the cloned state (using the identifier). Once the problem ticket has been used by an administrator for servicing and/or rectifying the problematic scenario, the clone, in operation 214, may be dismissed (i.e. removed from the cloud computing platform 210) for conserving computing resources, etc.

Figure 3:
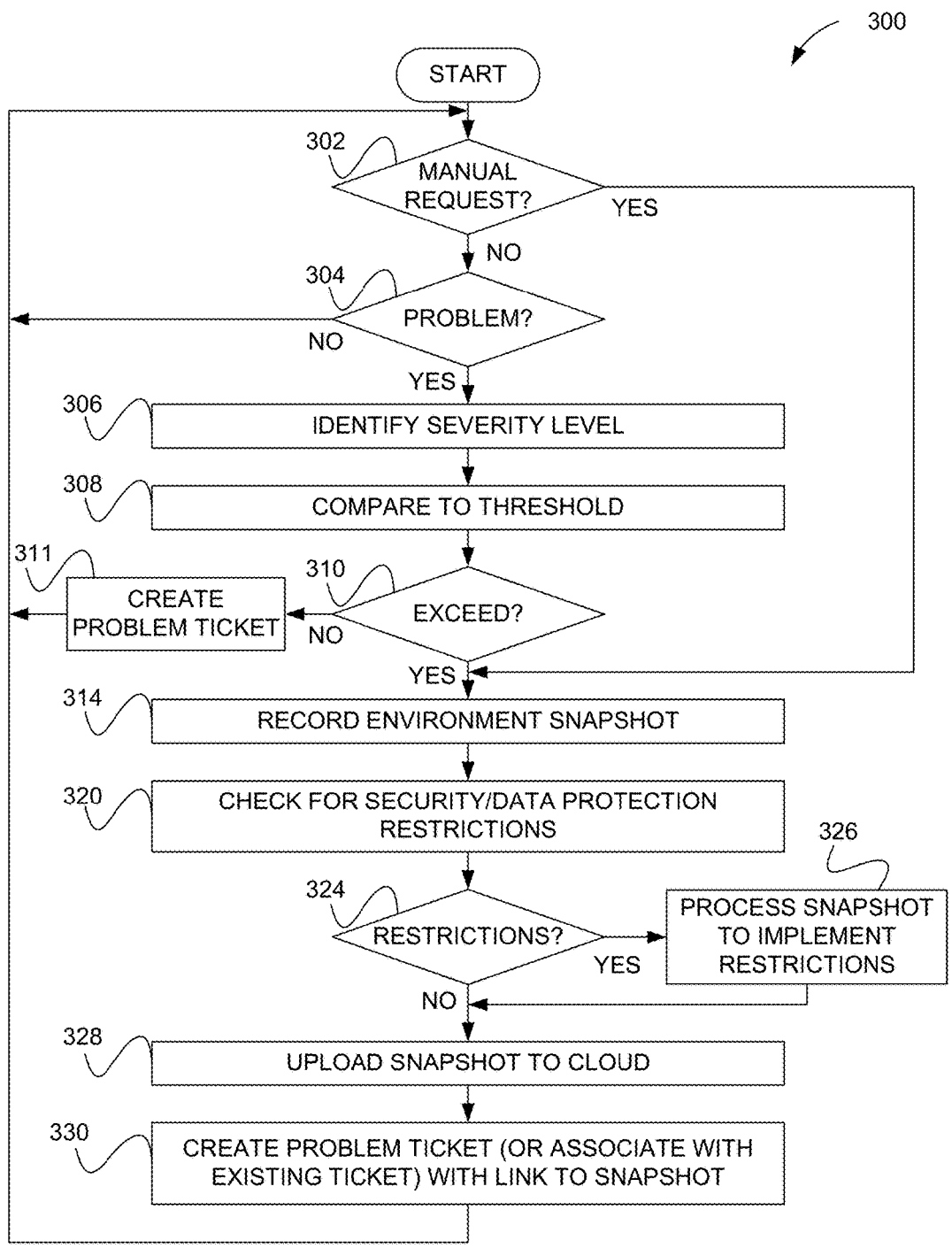
FIG. 3 illustrates a method for generating a cloned environmental state and a problem ticket with a link to the cloned environmental state, in accordance with one embodiment.

FIG. 3 illustrates a method 300 for generating a cloned environmental state and a problem ticket with a link to the cloned environmental state, in accordance with one embodiment. As an option, the method 300 may be implemented in the context of any one or more of the embodiments set forth in any previous and/or subsequent figure(s) and/or description thereof. However, it is to be appreciated that the method 300 may be implemented in the context of any desired environment.

As shown in decisions 302-304, the cloned environment state/problem ticket generation of the method 300 may be initiated either manually and/or automatically (in response to a problem). Specifically, in decision 302, user input is detected such that, in response to the detection of the user input, the environmental state of the system may be automatically cloned (e.g. in the form of a snapshot) and associated with existing tickets or problem ticket generated, as will soon become apparent. In various embodiment, such user input may be generated using any interface of a problem ticketing system (and even from a specific problem ticket). This may be accomplished in any desired manner, e.g. selection of a user interface element, etc.

In decision 304, the problematic scenario may be detected in any desired manner. For example, the problematic scenario may be detected by detecting one or more predefined triggers. In various embodiments, such triggers may include any symptoms of a problematic scenario including, but not limited to an error, a failure, and/or subpar performance (e.g. processing speed falling below a threshold, etc.).

To the extent that the problematic scenario is detected in decision 304, a severity level (associated with the scenario) is determined in operation 306. Such severity level may refer to any data structure that includes or describes the problematic scenario (and/or the aforementioned triggers associated therewith). In various embodiments, the severity level may refer to an informational message, a warning, a fatal crash, etc.

Further, in operation 308, the severity level is compared to a predetermined threshold to determine whether the severity level exceeds the same in decision 310. In one embodiment, the predetermined threshold may be preconfigured by an administrator or configured in any other desired manner. Further, the threshold may include a requisite minimum severity level (e.g. error/failure vs. an informational message/warning, etc.). To this end, if the severity level does not rise to the level of the threshold, a problem ticket may be possibly created (see operation 311), but without the cloning of the environmental state. On the other hand, if the severity level does rise to the level of (or exceed) the threshold, the environmental state may be cloned in connection with problem ticket creation (see operation 311), as will soon be described. Thus, the environmental state of the system is conditionally cloned, based on the comparison of operations 308-310.

With continuing reference to FIG. 3, the environment state of the system is cloned per operation 314. This may, in the current embodiment, be accomplished by recording an environment snapshot. As an option, one or more restrictions may be identified in operation 320. In the context of the present description, such restriction(s) may refer to any policy that results in an administrator (who is tasked with addressing the problematic scenario) not having full access to at least one aspect (e.g. data, etc.) of the cloned system. To this end, the environmental state of the system may be automatically cloned based on the one or more restrictions. See operation 326.

In various embodiments, the aforementioned restrictions may be put into place in any desired way. For example, the one or more restrictions may be determined by the customer (e.g. by defining or selecting restriction policies, etc.). In various possible embodiments, the customer may select specific data that is to be restricted, or simply select an option that all data is to be restricted.

Further, the aforementioned restrictions may be implemented in any desired manner. For example, the restrictions may be put into place before, during, and/or after the cloning and/or uploading thereof (see operation 328). Specifically, in one embodiment where the restrictions restrict access to certain data, the restriction(s) may results in source data of the system being masked. This may be accomplished, in one embodiment, by omitting the data prior to cloning, multiplexing the data during cloning, or multiplexing the data after the cloning. Further, the restrictions may be implemented in the customer environment (e.g. customer environment 204 of FIG. 2) and/or in the cloud (e.g. cloud platform 210 of FIG. 2).

As indicated in operation 330, a problem ticket is created with a link to the aforementioned snapshot. In another embodiment, the aforementioned link and/or any other information may be associated with an already-existing problem ticket. Thus, the problem ticket may be provided in any desired manner.

In use, such problem ticket may be stored and queued with other problem tickets for being selected and accessed by administrators tasked with resolving the underlying problematic scenarios. To facilitate such efforts in a manner that reduces any detrimental impact on the customer, the aforementioned administrators, using the link, may access the environment (where the problem lies) via the cloned environmental state instead of or in addition to the actual environment. This, in turn, reduces or removes a need for the administrator to access the system while the customer is still using the same, issue requests to the customer (e.g. to access the system, etc.), etc. which, in turn, provides for an improved customer experience during troubleshooting. More information will now be set forth regarding one possible way the administrators may utilize the problem ticket (with link to snapshot) in such manner.

Figure 4:
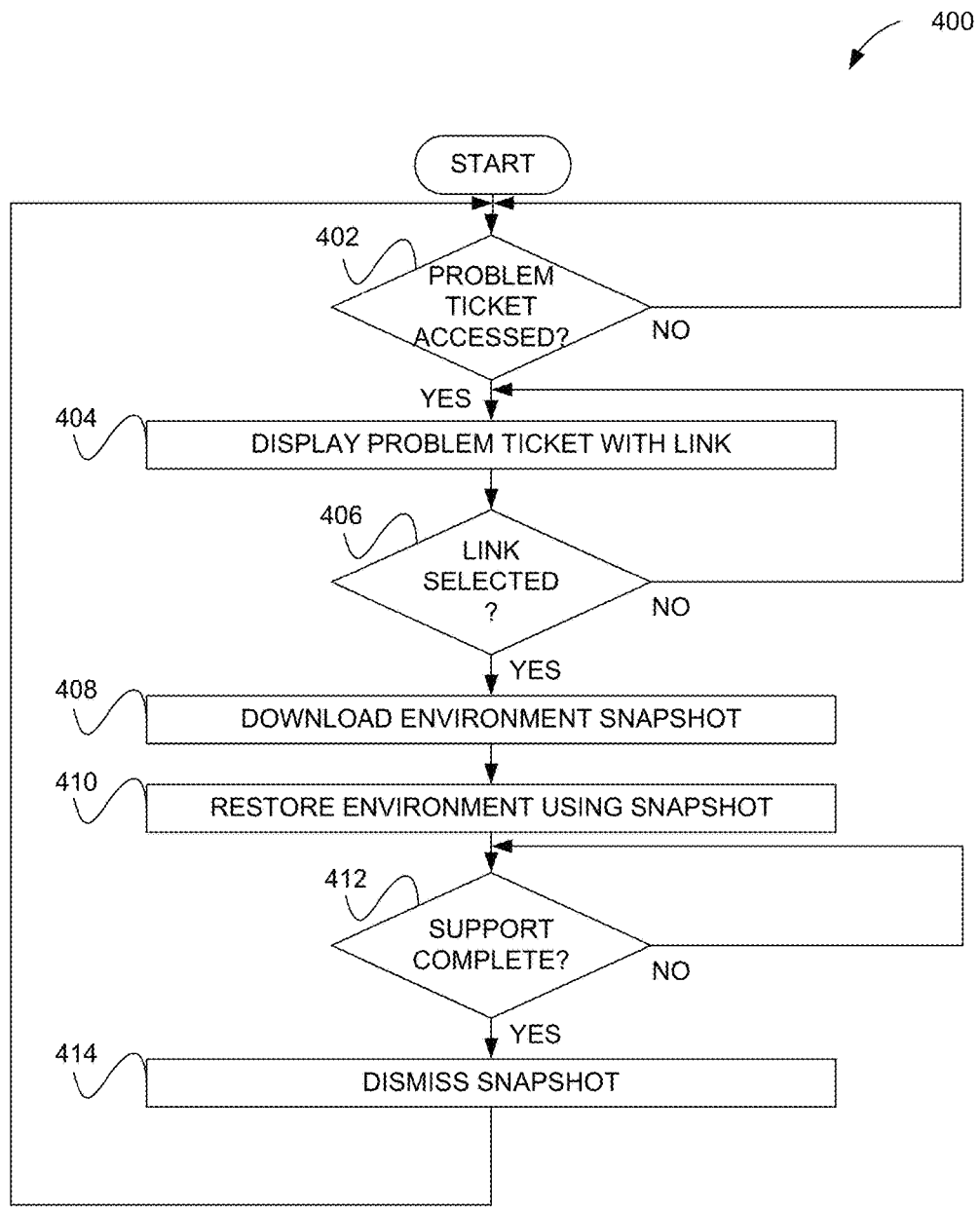
FIG. 4 illustrates a method for accessing a problem ticket with a link to the cloned environmental state, in accordance with one embodiment.

FIG. 4 illustrates a method 400 for accessing a problem ticket with a link to the cloned environmental state, in accordance with one embodiment. As an option, the method 400 may be implemented in the context of any one or more of the embodiments set forth in any previous and/or subsequent figure(s) and/or description thereof. However, it is to be appreciated that the method 400 may be implemented in the context of any desired environment.

As shown, it is determined in decision 402 whether the problem ticket is accessed for a problematic scenario(s). Upon access, the problem ticket for the problematic scenario(s) is displayed with the link. See operation 404. It is then determined whether user input is detected in connection with the link, per decision 406. In response to the detection of the user input, the cloned environmental state of the system (e.g. that occurred as a result of operation 330 of FIG. 3), is downloaded in operation 408 (e.g. from a platform such as the cloud platform 210 of FIG. 2).

Thus, in operation 410, the cloned environmental state may be restored for being accessed by an administrator. As mentioned earlier, such access may or may not be the subject of any restrictions (e.g. per operation 326 of FIG. 3). By this design, the administrator may provide support to address and/or rectify the problematic scenario.

With continuing reference to FIG. 4, it is determined in decision 412 whether the support is complete. If so, the cloned environmental state of the system (e.g. snapshot) may be deleted in operation 414, after a servicing of the problem ticket is complete per decision 412. More information will now be set forth regarding one possible interface by which the operations 402-414 may be carried out.

Figure 5:
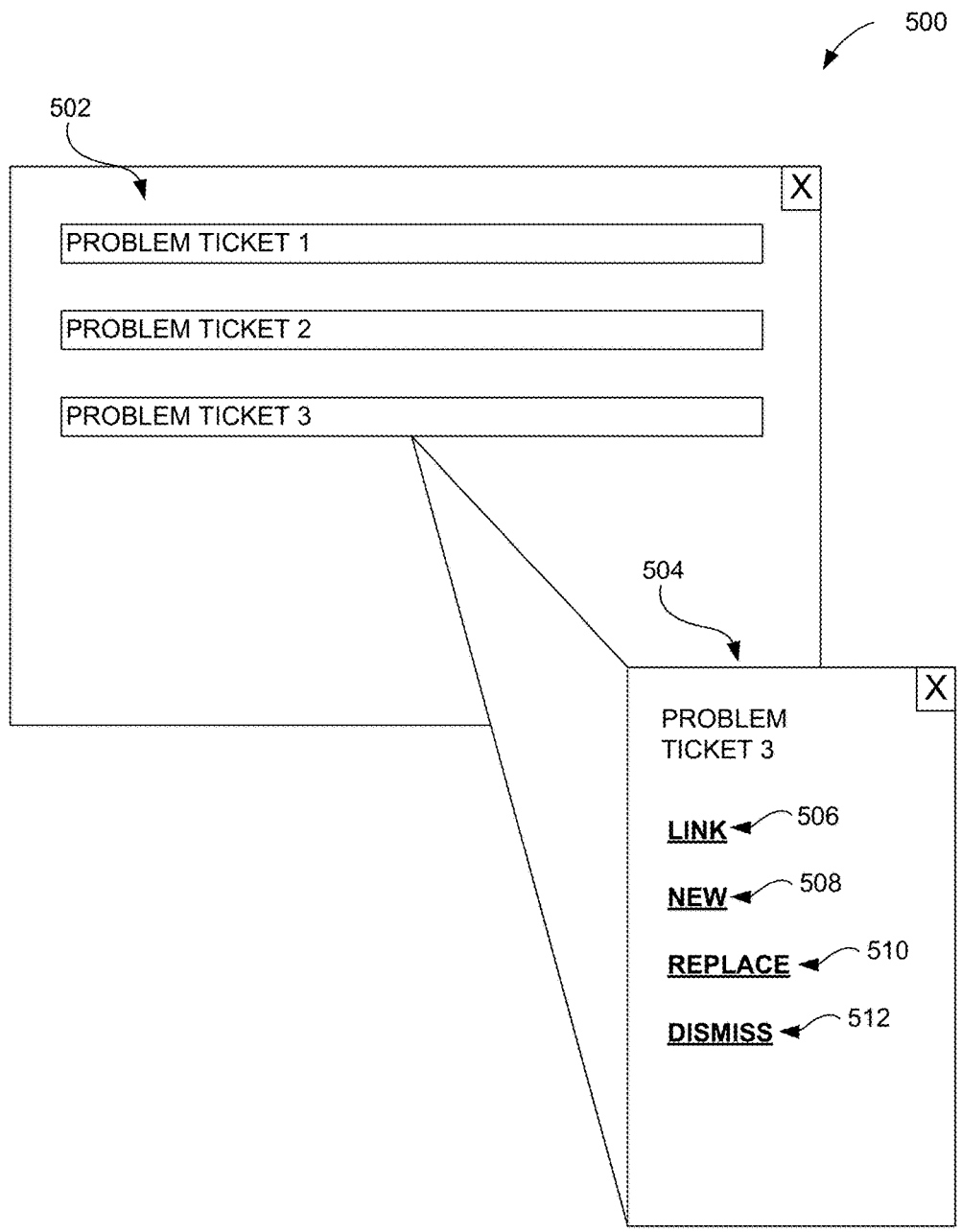
FIG. 5 illustrates a user interface for accessing a problem ticket with a link to the cloned environmental state for providing support, in accordance with one embodiment.

FIG. 5 illustrates a user interface 500 for accessing a problem ticket with a link to the cloned environmental state for providing support, in accordance with one embodiment. As an option, the user interface 500 may be implemented in the context of any one or more of the embodiments set forth in any previous and/or subsequent figure(s) and/or description thereof. However, it is to be appreciated that the user interface 500 may be implemented in the context of any desired environment.

As shown, the user interface 500 in the form of a problem ticket summary displays a list of a plurality of problem tickets 502 (represented as graphical user interface elements) that may be accessed by selecting the same. Upon the selection of one of the problem tickets 502, a particular problem ticket interface 504 is displayed with information about the particular problem ticket. Such information may include, but is not limited to a description of the underlying problematic scenario (e.g. date/time, specific computing device, symptoms, etc.), which if any triggers caused the generation of the problem ticket, a severity level, etc.

Also displayed on the particular problem ticket interface 504 is a plurality of action options. Specifically, a link option 506 may be provided for accessing the environmental state (e.g. snapshot), for one or more of: accessing the snapshot, downloading the snapshot, using the snapshot to restore the computing environment for troubleshooting purposes, troubleshooting the snapshot and/or the restored environment, etc. Any of the forgoing may be caused as a result of the selection of the link or caused by a selection of various options on yet another interface (not shown) that is displayed in response to the selection of the link option 506.

As further options, the particular problem ticket interface 504 may further include a new option 508 for generating another snapshot in response to the selection thereof (e.g. to trigger decision 302 of FIG. 3). As a further option, a replace option 510 may be provided for, in response to the selection thereof, replacing the original snapshot (associated with the link option 506), and provide any of the possibilities set forth earlier in connection with the link option 506. Still yet, a dismiss option 512 may be provided for, in response to the selection thereof, deletion of a local and/or remote (in a cloud platform) copy of the snapshot (e.g. to trigger 412 of FIG. 4).

By this design, the present techniques disclosed herein allow a support team to work on environments identical or similar to production environments of the customer, and to navigate upon an archive of environments organized by a history of support events. This may, in turn, enhance the way support teams performs their analysis.

An environment as a service (EaaS) is thus provided for troubleshooting complex systems. In some optional embodiments, such EaaS provides support organizations with a new set of capabilities to conduct fast and accurate analysis on an exact faulty environment state in a non-intrusive mode, at any given time, and without depending on customer environment availability.

To this end, various possible features are afforded. For example, full environments state may be cloned (e.g. involving memory, file system, database, live process, etc.). Further, such cloning may be driven by error severity and stored and managed in a cloud-based cloning environments management. Still yet, automatic support incident creation may be provided in connection with the cloned environments. Still yet, sensitive data elements may be secured based on an automatic masking of preconfigured data elements.

Thus, the EaaS may, in some optional embodiments, provide an opportunity to use a virtualization platform to clone environments proactively or by request, and to snapshot an environment into images that may be stored as files in an archive. The virtualization platform may also provide enhanced capabilities to clone a full environment state including file system memory state, live processes (e.g. threads, etc.), etc. In an event of a process failure, an environment snapshot may be recorded and uploaded to a cloud archive.

In parallel to the snapshot construction, a problem ticket (e.g. incident report) may be created and recorded in a ticketing system for future investigation. Further, the incident report is linked automatically to a relevant snapshot that can be reconstructed at any given time to the exact or similar production environment state. A support engineer may thus perform accurate and prompt off-site analysis at any time, free of live environment availability constraints.

Further, the clone mechanism may allow for defining and deploying sets of security and data protection restrictions to allow masking (e.g. multiplexing, etc.) of source data, thus maintaining valid data integrity. The masking process may also cover all related pre-configured data elements. The customer may thus have the flexibility to define data protection policy or choose from a predefined set of policies. Further, communication from a source system to the cloud platform may be protected by advanced security technology and protocols.

Thus, in some optional embodiments, various possible advantages may include, but are not limited to: shorter incident resolution turnaround time, reduction in efforts involved with a set-up of environments for analysis and testing, higher quality prognosis and patches, reduction of overall incident handling waste, improvement in customer satisfaction, and/or hardware cost saving. Again, these advantages are set forth for illustrative purposes only and should not be construed as limiting in any manner.

Figure 6:
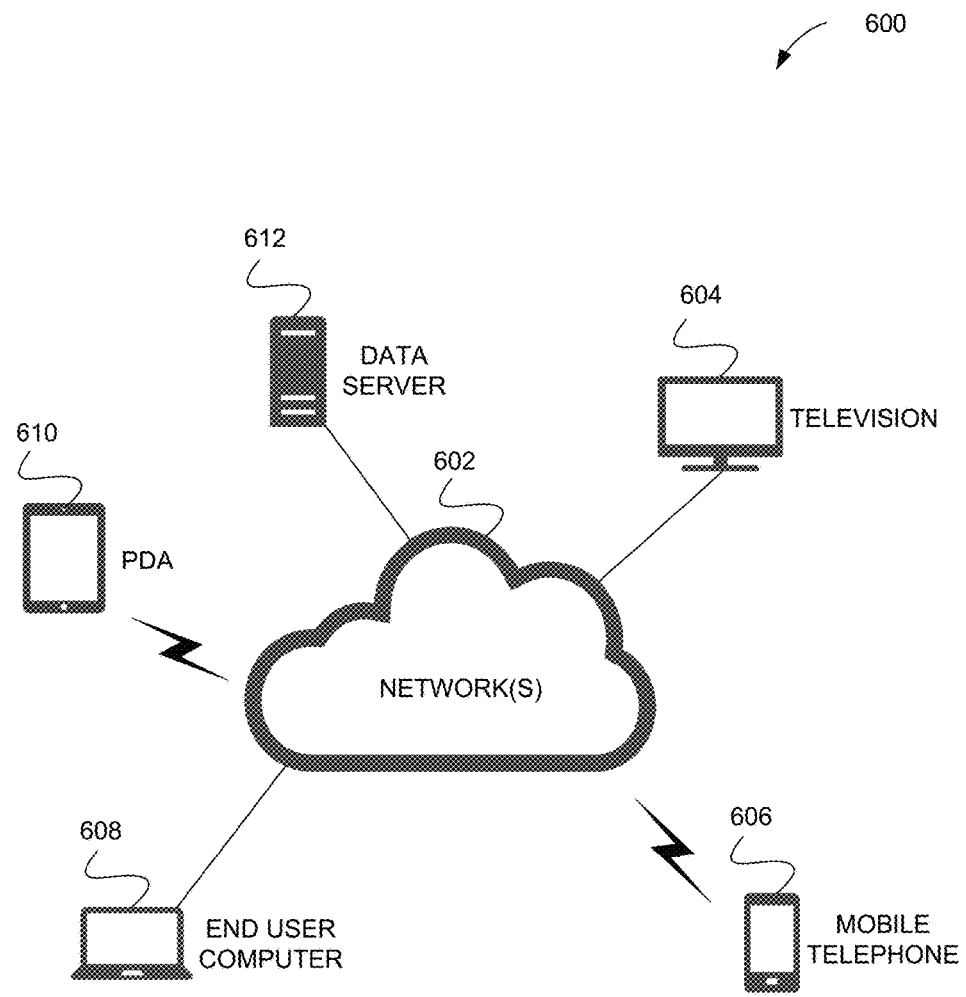
FIG. 6 illustrates a network architecture, in accordance with one possible embodiment.

FIG. 6 illustrates a network architecture 600, in accordance with one embodiment. As shown, at least one network 602 is provided. In various embodiments, any one or more components/features set forth during the description of any previous figure(s) may be implemented in connection with any one or more of the components of the at least one network 602.

In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 612 and an end user computer 608 may be coupled to the network 602 for communication purposes. Such end user computer 608 may include a desktop computer, lap-top computer, and/or any other type of logic. Still yet, various other devices may be coupled to the network 602 including a personal digital assistant (PDA) device 610, a mobile phone device 606, a television 604, etc.

Figure 7:
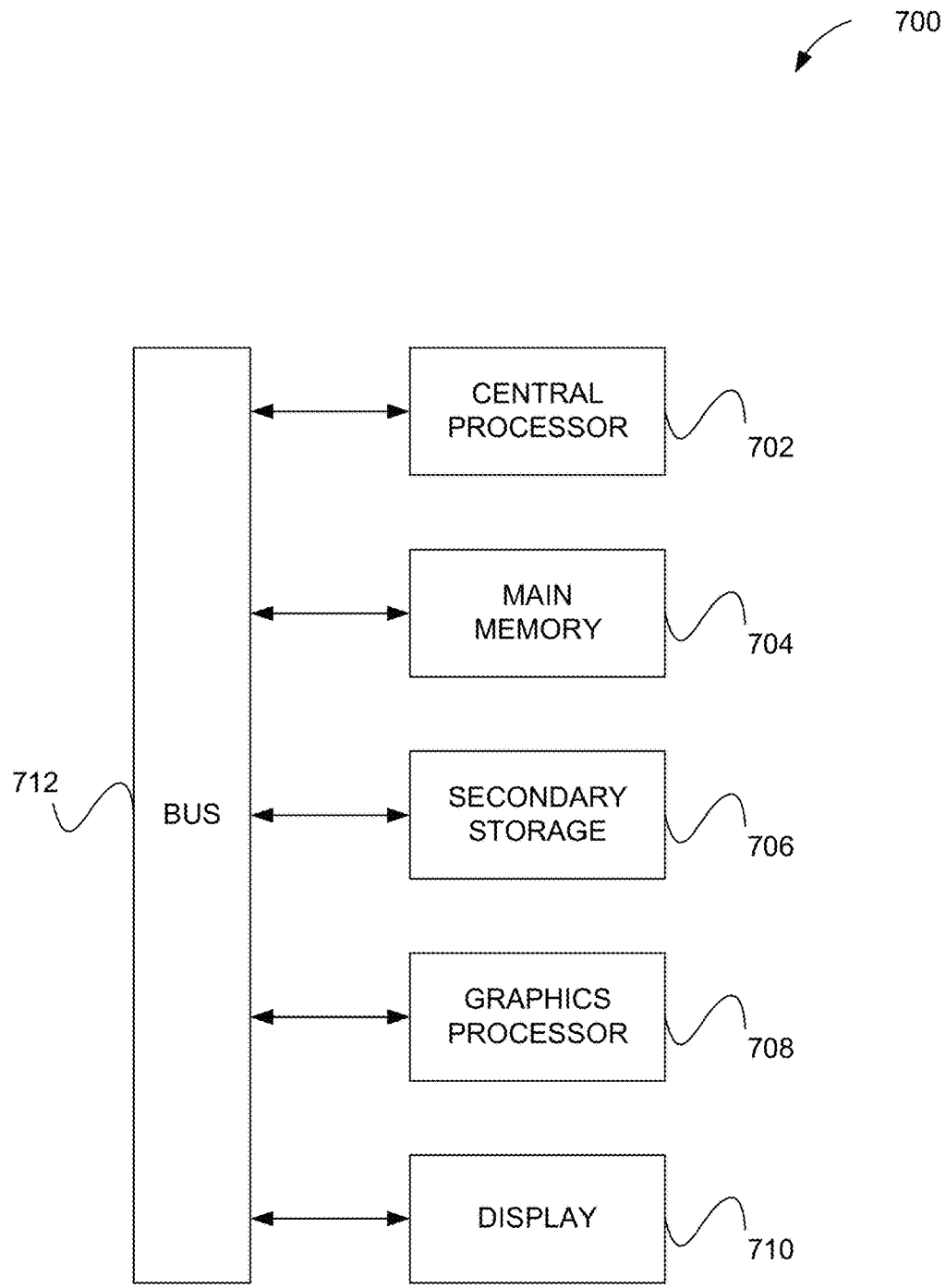
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. However, it is to be appreciated that the system 700 may be implemented in any desired environment.

As shown, a system 700 is provided including at least one central processor 702 which is connected to a bus 712. The system 700 also includes main memory 704 [e.g., hard disk drive, solid state drive, random access memory (RAM), etc.]. The system 700 also includes a graphics processor 708 and a display 710.

The system 700 may also include a secondary storage 706. The secondary storage 706 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 706, and/or any other memory, for that matter. Such computer programs, when executed, enable the system 700 to perform various functions (as set forth above, for example). Memory 704, secondary storage 706 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product comprising computer executable instructions stored on a non-transitory computer readable medium that when executed by a processor instruct the processor to:
   detect at least one problematic scenario in connection with a system associated with a customer of a communication service provider (CSP), the detecting occurring when the system exhibits at least one of: an error, a failure, or subpar operation;
   in response to the detection of the at least one problematic scenario in connection with the system associated with the customer of the CSP, automatically create a cloned environment state by cloning an environmental state of the system including:
   a file system memory state of the system, and
   one or more processes of the system running at a time of the cloning;
   automatically generate a problem ticket for the at least one problematic scenario, the problem ticket having a link configured for permitting access to the cloned environment state;
   allow the problematic scenario to be rectified via the problem ticket, by:
   receiving, from a user, user input in connection with the link,
   responsive to the user input, providing the cloned environment state to a device of the user, and
   allowing the user to rectify the problematic scenario using the provided cloned environment state.

2. The computer program product of claim 1, wherein the computer program product is configured such that the at least one problematic scenario is detected by detecting one or more predefined triggers.

3. The computer program product of claim 1, wherein the computer program product is configured to:
   determine a severity level of the at least one problematic scenario;
   compare the severity level with a predetermined threshold; and
   automatically create the cloned environment state when the severity level exceeds the predetermined threshold.

4. The computer program product of claim 1, wherein the computer program product is configured to store the cloned environmental state of the system over a network.

5. The computer program product of claim 1, wherein the computer program product is configured to:
   delete the cloned environmental state of the system, after the user rectifies the problematic scenario.

6. The computer program product of claim 1, wherein the computer program product is configured to:
   identify one or more restrictions, wherein the cloned environmental state is automatically created based on the one or more restrictions.

7. The computer program product of claim 6, wherein the computer program product is configured such that the one or more restrictions are determined by the customer.

8. The computer program product of claim 6, wherein the computer program product is configured such that the one or more restrictions results in source data of the system being masked.

9. An apparatus, comprising:
   at least one processor configured to:
   detect at least one problematic scenario in connection with a system associated with a customer of a communication service provider (CSP), the detecting occurring when the system exhibits at least one of: an error, a failure, or subpar operation;

in response to the detection of the at least one problematic scenario in connection with the system associated with the customer of the CSP, automatically create a cloned environment state by cloning an environmental state of the system including:

a file system memory state of the system, and one or more processes of the system running at a time of the cloning;

automatically generate a problem ticket for the at least one problematic scenario, the problem ticket having a link configured for permitting access to the cloned environment state;

allow the problematic scenario to be rectified via the problem ticket, by:

receiving, from a user, user input in connection with the link, responsive to the user input, providing the cloned environment state to a device of the user, and allowing the user to rectify the problematic scenario using the provided cloned environment state.

10. The apparatus of claim 9, wherein the apparatus is configured such that the at least one problematic scenario is detected by detecting one or more predefined triggers.

11. The apparatus of claim 9, wherein the apparatus is configured to:

determine a severity level of the at least one problematic scenario;

compare the severity level with a predetermined threshold; and automatically create the cloned environment state when the severity level exceeds the predetermined threshold.

12. The apparatus of claim 9, wherein the apparatus is configured to store the cloned environmental state of the system over a network.

13. The apparatus of claim 9, wherein the apparatus is configured to:

delete the cloned environmental state of the system, after the user rectifies the problematic scenario.

14. A method, comprising:

detecting at least one problematic scenario in connection with a system associated with a customer of a communication service provider (CSP), the detecting occurring when the system exhibits at least one of: an error, a failure, or subpar operation;

in response to the detection of the at least one problematic scenario in connection with the system associated with the customer of the CSP, automatically create a cloned environment state by cloning an environmental state of the system including:

a file system memory state of the system, and one or more processes of the system running at a time of the cloning;

automatically generating a problem ticket for the at least one problematic scenario, the problem ticket having a link configured for permitting access to the cloned environment state;

allowing the problematic scenario to be rectified via the problem ticket, by:

receiving, from a user, user input in connection with the link, responsive to the user input, providing the cloned environment state to a device of the user, and allowing the user to rectify the problematic scenario using the provided cloned environment state.

\* \* \* \* \*